United States Patent
Lamesch

(10) Patent No.: US 7,924,411 B2
(45) Date of Patent: Apr. 12, 2011

(54) 3-D IMAGING SYSTEM

(75) Inventor: Laurent Lamesch, Lamadelaine (LU)

(73) Assignee: IEE International Electronics & Engineering S.A., Luxembourg (LU)

( * ) Notice: Subject to any disclaimer, the term of this patent is extended or adjusted under 35 U.S.C. 154(b) by 316 days.

(21) Appl. No.: 11/908,917

(22) PCT Filed: Mar. 1, 2006

(86) PCT No.: PCT/EP2006/060374
§ 371 (c)(1),
(2), (4) Date: Sep. 17, 2007

(87) PCT Pub. No.: WO2006/097406
PCT Pub. Date: Sep. 21, 2006

(65) Prior Publication Data
US 2008/0180650 A1    Jul. 31, 2008

(30) Foreign Application Priority Data
Mar. 17, 2005   (EP) ..................................... 05102113

(51) Int. Cl.
*G01C 3/08* (2006.01)
(52) U.S. Cl. ..................................... 356/5.15; 356/5.01
(58) Field of Classification Search ................ 356/4.01, 356/4.03, 5.01, 28, 5.15
See application file for complete search history.

(56) References Cited

U.S. PATENT DOCUMENTS

| | | | | |
|---|---|---|---|---|
| 6,727,985 | B2 * | 4/2004 | Giger | 356/5.15 |
| 7,268,858 | B2 * | 9/2007 | Kuijk et al. | 356/5.01 |
| 7,499,150 | B2 * | 3/2009 | Lewis et al. | 356/5.01 |
| 7,764,359 | B2 * | 7/2010 | Luo et al. | 356/5.15 |
| 2007/0296951 | A1 * | 12/2007 | Kuijk et al. | 356/5.02 |
| 2008/0100822 | A1 * | 5/2008 | Munro | 356/4.01 |

FOREIGN PATENT DOCUMENTS

| DE | 4439298 A1 * | 6/1996 |
|---|---|---|
| JP | 2003043145 | 2/2003 |

OTHER PUBLICATIONS

Palojarvi et al. "Integrated Time-of-Flight Laser Radar", Instrumentation and Measurement Technology Conference, Conference Proceeedings. IEEE Brussels, Belgium Jun. 4-6, 1996, New York, NY, USA,IEEE, vol. 2, Jun. 4, 1996, pp. 1378-1381.*
JP Examination Report, P2008-502268; dated Nov. 4, 2010 (English translation attached).

* cited by examiner

*Primary Examiner* — Isam Alsomiri
(74) *Attorney, Agent, or Firm* — Cantor Colburn LLP

(57) ABSTRACT

A 3-D imaging system is described. The 3-D imaging system comprises an illumination unit for emitting light onto a target scene, an imaging sensor for imaging the target scene by detecting scattered/reflected light, an evaluation unit for determining distance information related to the target scene on the basis of light propagation time and synchronization means for providing synchronization information to the evaluation unit. The synchronization means comprises means for generating an electrical reference signal in the illumination unit, the reference signal being directly derived from the emitted light.

10 Claims, 2 Drawing Sheets

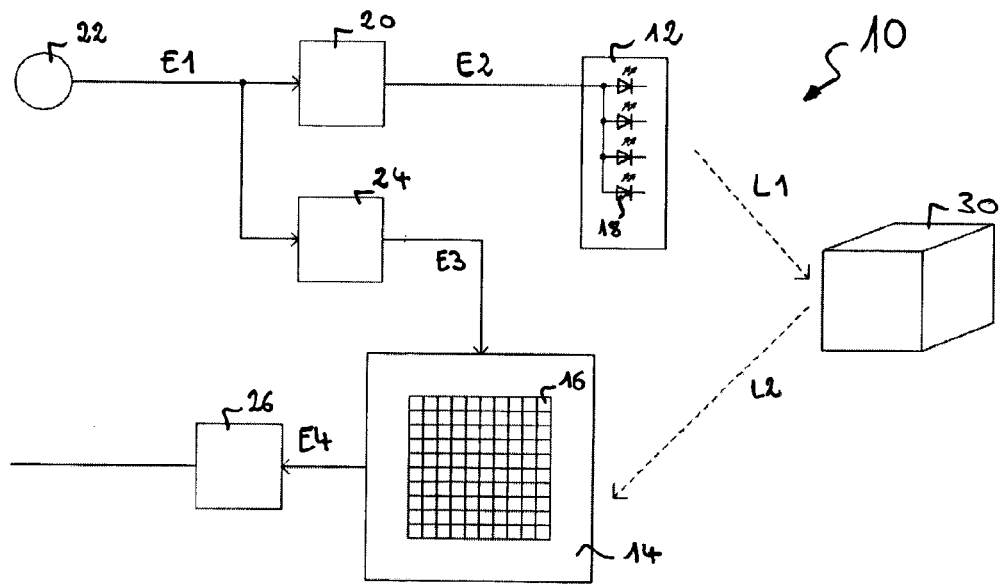
PRIOR ART
— FIG.1 —
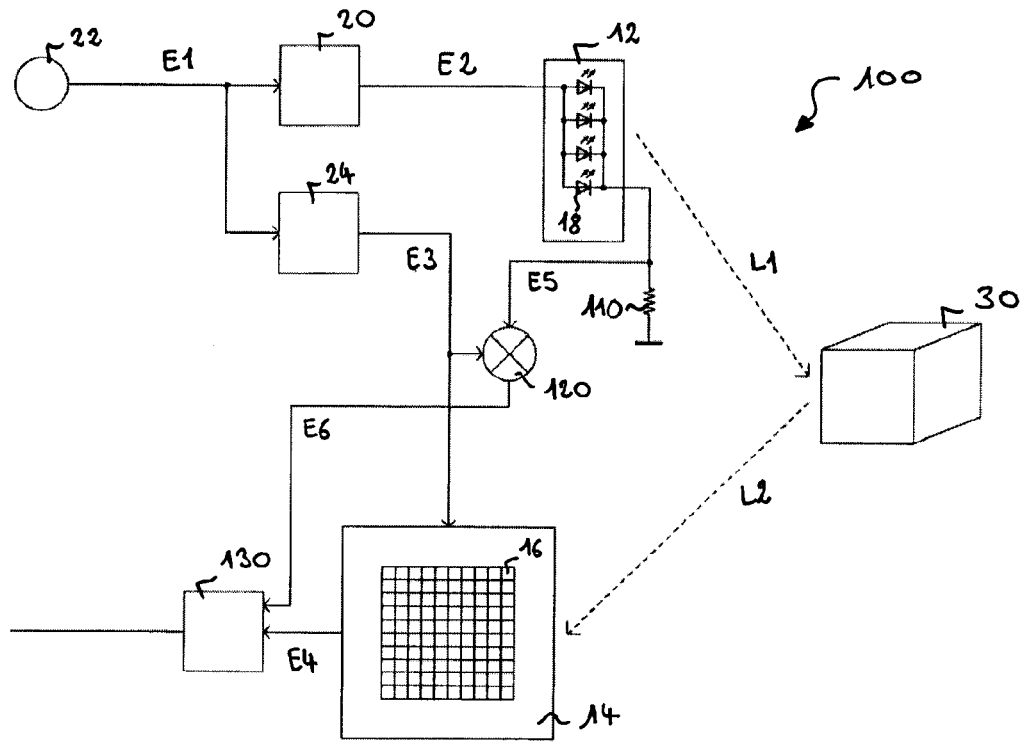
— FIG.2 —

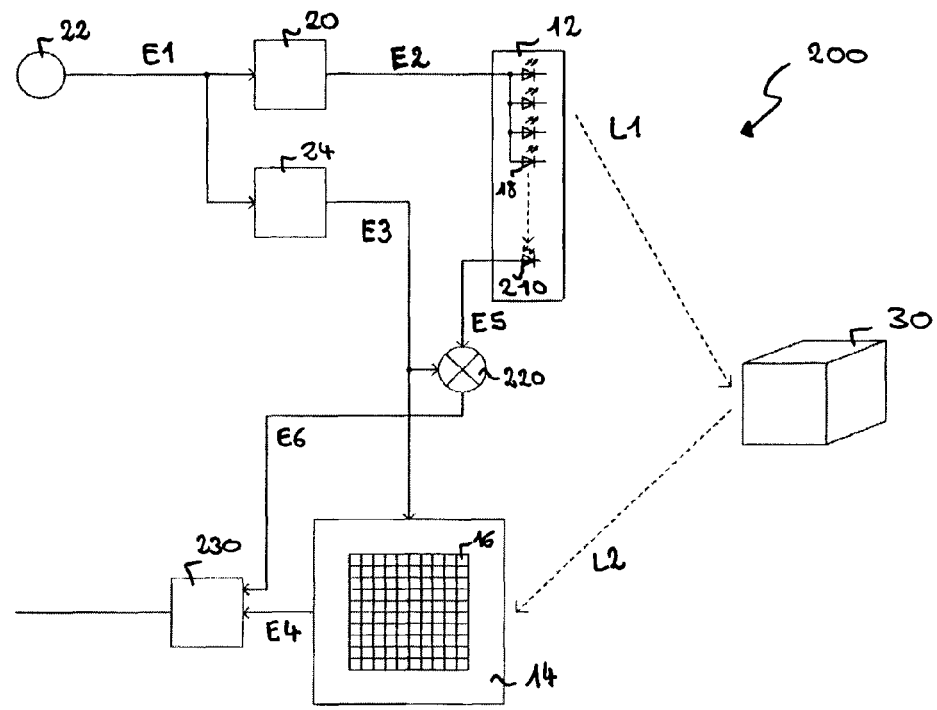
– FIG.3 –
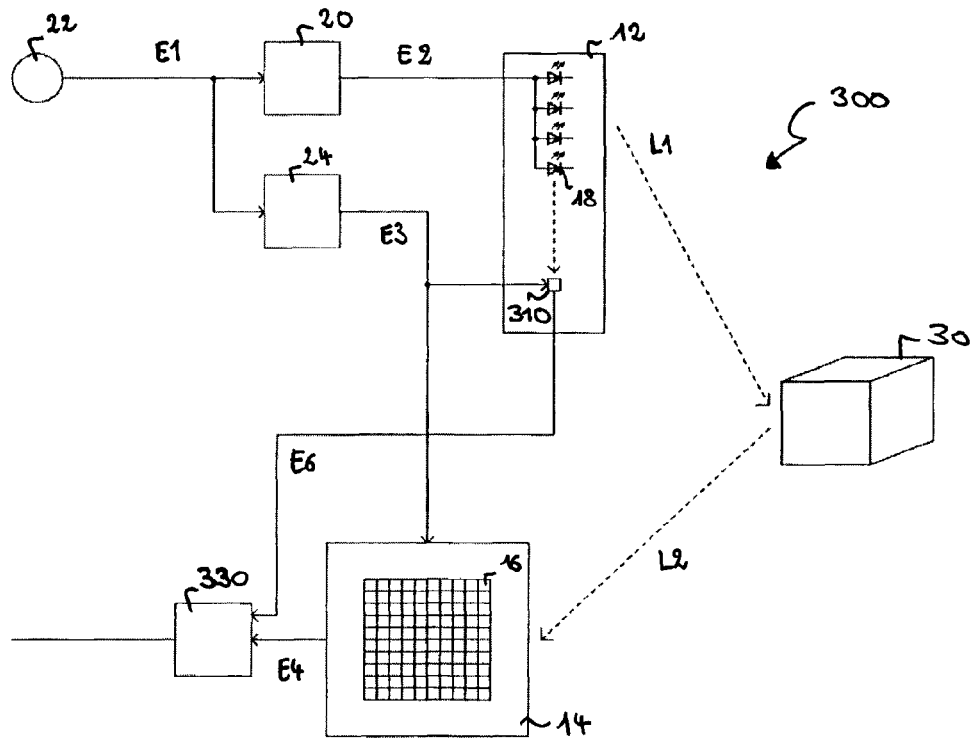
– FIG.4 –

3-D IMAGING SYSTEM

TECHNICAL FIELD OF THE INVENTION

The present invention relates to a 3-D (three-dimensional) imaging system.

BRIEF DESCRIPTION OF RELATED ART

Systems for creating a 3-D representation of a given portion of space have a variety of potential applications in many different fields. Examples are automotive sensor technology (e.g. vehicle occupant detection and classification), robotic sensor technology (e.g. object identification) or safety engineering (e.g. plant monitoring) to name only a few. As opposed to conventional 2-D imaging, a 3-D imaging system requires depth information about the target scene, i.e. the distances between one or more observed objects and an optical receiver of the system need to be determined. A well known approach for distance measurement, which is used e.g. in radar applications, consists in timing the interval between transmission and echo-return of a transmitted measurement signal. This approach is based on the principle that, for a signal with known propagation speed in a given medium, the distance to be measured is given by the product of the propagation speed and the time the signal spends to travel back and forth.

In case of optical imaging systems, the measurement signal consists of light waves. Where for the purposes of the present, the term light is used in simplifying manner, this term is to be understood as including electromagnetic waves in general and as encompassing the non-visible spectra of light (e.g. IR and UV) in particular.

A distance measurement by means of light waves generally requires a temporal variation of the emitted light. Besides other techniques, two known approaches consist in the so-called time of flight (TOF) method and the so-called phase shift method. In phase shift measurements, the amplitude of the emitted light is periodically modulated (e.g. by sinusoidal modulation). In TOF measurements light is normally emitted in pulses without the requirement of periodicity. In phase shift measurements, the modulation period is normally in the order of twice the maximum measurement distance divided by the velocity of light. In this approach, the propagation time interval is determined as phase difference by means of a phase comparison between the emitted and the received light signal. Such phase comparison requires synchronization of the demodulation with the emitted light signal. Due to the high propagation speed given by the velocity of light, a fundamental difficulty encountered in distance measurements based on the TOF or phase-shift method resides in the required temporal resolution of the measurement device. In fact, a spatial resolution in the order of centimetres requires a temporal resolution in the order of $10^{-11}$ seconds (10 ps).

With both the pulsed light and phase shift methods, time intervals are generally measured in the electrical domain. Therefore, electric propagation times and delays which affect the synchronization in the measurement device have a determining influence on the measurement accuracy. Actual problems in this respect are unknown variations and drifts of the electric propagation times on the signal lines and of the delays in the electronic components. On the one hand, fixed variations between devices of the same type occur, for example because of tolerances in the production processes (e.g. semiconductor production). On the other hand, time varying drifts occur during operation, e.g. due to temperature variations or component ageing. These variations and drifts have a detrimental influence on measurement accuracy.

As a result, efforts have been made to overcome this problem by providing a more reliable synchronization. It has been proposed, for example by Schwarte in WO98/10255, to provide an optical feedback path from the light emitting module to one or more sensor cells of the light receiving camera. As shown in DE 44 39 298 by Schwarte, a phase reference for synchronization purposes can be obtained by guiding the emitted light without reflection to the receiver e.g. through an optical fibre.

BRIEF SUMMARY OF THE INVENTION

The invention provides an improved 3-D imaging system which over-comes the aforementioned problems.

In order to overcome the abovementioned problems, the present invention proposes a 3-D imaging system comprising an illumination unit for emitting light onto a target scene and an imaging sensor for imaging the target scene by detecting scattered/reflected light. The system also comprises an evaluation unit, for determining distance information related to the target scene on the basis of light propagation time, and synchronization means for providing synchronization information to the evaluation unit. According to an important aspect of the invention, the synchronization means comprises means for generating an electrical reference signal in the illumination unit, the reference signal being directly derived from the emitted light. Light propagation time is to be understood as the time interval needed for a certain distinguishing mark of the emitted time varying light to propagate from the illumination unit to the target where it is reflected/scattered and from there back to the imaging sensor where it is detected. Light propagation time is measured by any suitable method such as the aforementioned TOF or phase-shift methods.

In case of the phase-shift method, the illumination unit emits a temporally modulated periodical light signal. This signal allows to determine the time interval, which in this case is measured as a phase difference between the light signal emitted at the illumination unit and the scattered/reflected light signal detected at the imaging sensor. This phase difference is obtained by means of known demodulation techniques through a suitable imaging sensor and used by the evaluation unit to obtain the required distance information. In order to reduce the aforementioned measurement errors, the 3-D imaging system comprises synchronization means having a means for extracting or deriving phase information directly from the emitted light in the illumination unit by providing an electrical reference signal. This reference signal provides reference phase information that serves synchronization and is used to correct the distance calculation by the evaluation unit. When compared to the known approach of obtaining a reference phase by guiding the emitted light onto the imaging sensor, the need for a light conductor and the required efforts regarding mechanical mounting and optical shielding are entirely eliminated. Although generally illustrated by reference to the phase shift method, the present invention is readily applicable to a 3-D imaging system using a pulsed light (TOF) measurement or similar method.

In order to further improve synchronization, the means for generating an electrical reference signal is preferably placed contiguous to at least one light source of the illumination unit. By minimizing optical and/or electrical signal line lengths, the phase of the reference signal has maximum correspondence with the phase of the emitted light. As will be appreciated, the means for generating an electrical reference signal is operatively independent of the imaging sensor. Accordingly, no mechanical modifications on the imaging sensor are required when improving synchronization according to the present invention.

In a first embodiment, the means for generating an electrical reference signal comprises a shunt resistor for providing a voltage as a function of an illumination current of the illumination unit. This embodiment provides a simple, economical and yet reliable solution. In a variant of the invention, the means for generating an electrical reference signal can comprise an optoelectronic converter arranged in the illumination unit. For example, in a second embodiment, the optoelectronic converter is a photodiode allowing immediate detection of the light emitted by the illumination unit. In a third embodiment, the optoelectronic converter is an independent sensor cell, which has essentially the same configuration as the sensor cells of the imaging sensor, allowing immediate detection of the light emitted by the illumination unit.

In case of the first or second embodiment, the synchronization means preferably comprises a mixer element for reproducing the characteristics of a sensor cell of the imaging sensor. The mixer element together with the means for generating an electrical reference signal essentially imitates a sensor cell of the imaging sensor placed at zero distance before the illumination unit. This provides a zero phase difference configuration for direct reference measurement.

A preferred type of imaging sensor used in the 3-D imaging system comprises a two-dimensional pixel array camera. For example, existing integrated lock-in pixel camera chips based on CCD (charge coupled device), CMOS (complementary metal oxide semiconductor) and/or TFA (thin film on ASIC) technologies are suitable for the 3-D imaging system according to the invention.

Advantageously, the evaluation unit comprises a signal processing unit which is connected to said imaging sensor and to said synchronization means. Depending on the used signal processing unit and existing 3-D imaging system configuration, the means for generating an electrical reference signal can be integrated into an existing design with comparatively little effort.

BRIEF DESCRIPTION OF THE FIGURES

The present invention will be more apparent from the following description of not limiting embodiments with reference to the attached drawings, wherein FIG. 1: is a schematic diagram of a prior art 3-D imaging system;

FIG. 2: is a schematic diagram of a 3-D imaging system according to a first embodiment of the invention;

FIG. 3: is a schematic diagram of a 3-D imaging system according to a second embodiment of the invention;

FIG. 4: is a schematic diagram of a 3-D imaging system according to a third embodiment of the invention.

DETAILED DESCRIPTION OF THE INVENTION

FIG. 1 shows a 3-D imaging system, generally identified by reference numeral 10. The 3-D imaging system 10 of FIG. 1 is known in the art and described for example in WO98/10255. It comprises an illumination unit 12, for emitting light onto a target scene, and an imaging sensor 14, for imaging the target scene. The imaging sensor 14 comprises, in a manner known per se, the required optical accessories such as a focusing lens (not shown) and an electronic camera chip executed in any suitable technology, such as CCD, CMOS and/or TFA. Accordingly, the imaging sensor 14 comprises a two-dimensional array of individual lock-in pixel sensor cells 16 each of which images a small portion of a target scene for creating a pixel-by-pixel image thereof.

The illumination unit 12 comprises several individual light emitting devices 18 such as light emitting diodes (LEDs), which are collectively driven by means of an illumination driver 20. A signal source 22 provides the input signals for the illumination driver 20 and a photo gate driver 24. The output of the photo gate driver 24 is connected to the imaging sensor 14. An evaluation unit 26 comprising a suitable electronic calculation device, e.g. a digital signal processor (DSP), is connected to the output of the imaging sensor 14.

In operation, the 3-D imaging system 10, based on the phase shift measurement method, works as summarized below. The signal source 22 generates a modulation signal E1 on its output and feeds this modulation signal E1 to the illumination driver 20. The latter drives the illumination unit 12 with a drive signal E2 to emit a temporally modulated light signal L1 onto a target scene comprising an object 30 (for illustration purposes). Examples for temporal modulation of the light signal L1 are a sinusoidal amplitude (i.e. light intensity) modulation or a periodically pulsed emission scheme. The modulated light signal L1 is reflected or scattered by the object 30 so as to form a returning light signal L2 which is received as incident light by the imaging sensor 14. The modulation signal E1 is also fed to the photo gate driver 24 which transforms the modulation signal E1 into a demodulation signal E3. The imaging sensor 14 receives this demodulation signal E3. By means of this demodulation signal E3 and the detected light signal L2, the imaging sensor 14 produces a phase information signal E4 which is fed to the evaluation unit 26 for extraction of the distance information concerning the object 30. Further details regarding the 3-D imaging technology schematically shown in FIG. 1 can be found e.g. in WO98/10255 and the relevant literature.

As explained above, the measurement accuracy of the device shown in FIG. 1 is limited due to unknown and/or time varying signal propagation times and component delays. In fact, ideally there should be no phase difference between the light signal L1 emitted at the illumination unit 12 and the demodulation signal E3. However, an uncontrollable phase difference is introduced between these signals due to several factors such as time varying delays in the illumination driver 20 and the photo gate driver 24. This phase difference adversely affects synchronization. As a result, significant errors may occur in the determination of the distance information, which is based on the phase relationship between the light signal L1 emitted at the illumination unit 12 and the light signal L2 detected at the imaging sensor 14.

FIGS. 2-4 show different embodiments of a novel 3-D imaging system which reduces measurement errors by directly extracting or deriving the phase of the emitted light signal L1 in the illumination unit 14. In FIGS. 2-4, identical or similar elements have been attributed identical reference numerals with respect to FIG. 1. Elements and functional relationships shall be detailed again only where different with respect to FIG. 1.

FIG. 2 shows a 3-D imaging system 100 according to a first embodiment. A shunt resistor 110 is connected in series to the light emitting devices 18 of the illumination unit 12 and to a ground terminal. The shunt resistor 110 provides a voltage proportional to the illumination current through the light emitting devices 18. This voltage is fed as an electrical reference signal E5 to a mixer element 120. In order to maximize the correspondence between the electrical reference signal E5 and the absolute temporal behaviour of the light signal L1 (at the illumination unit 14), the resistor 110 is placed as close as possible to the light emitting devices 18, within the illumination unit 12. Inevitable propagation times can however be taken into account during final evaluation in an evaluation unit 130. The mixer element 120 has essentially the same properties, in particular essentially the same transfer function, as the individual sensor cells 16 of the imaging sensor 14 with the exception that the mixer element 120 accepts as input a voltage instead of a light signal. The mixer element 120 receives the demodulation signal E3 on a further input and provides a synchronization signal E6. From a simple point of view, the mixer element 120 and the resistor 110 essentially reproduce the output of an individual lock-in pixel sensor cell 16 when placed at zero distance in front of the illumination unit 12. Accordingly, the shunt resistor 110 together with the mixer element 120 forms a synchronization means providing reference phase information to the evaluation unit 130. The evaluation unit 130 uses the synchronization signal E6 to calculate a reference distance and to subtract the latter form the distance calculated on the basis of the phase information signal E4. Thereby, the measurement error introduced by the prior art device of FIG. 1 is substantially reduced.

A second embodiment is shown in FIG. 3. The 3-D imaging system 200 of FIG. 3 essentially corresponds to the system of FIG. 2. The major difference in the 3-D imaging system 200 resides in a different means for generating the electrical reference signal E5. As seen in FIG. 3, a photodiode 210 is mounted in the illumination unit 12 contiguous to the light emitting devices 18. The photodiode 210 directly derives the electric reference signal E5 from the emitted light signal L1 by photoelectric conversion. A mixer element 220 receives the output current of the photodiode 210 and the demodulation signal E3 at its input and provides a synchronization signal E6 at its output. Similar to the mixer element 120 of FIG. 2, the mixer element 220 is designed to imitate, together with the photodiode 210, the function of a sensor cell 16 of the imaging sensor 14. Other characteristics of the 3-D imaging system 200 are identical to those of the 3-D imaging system 100 described with respect to FIG. 2.

FIG. 4 shows a further embodiment of a 3-D imaging system 300. In the 3-D imaging system 300 of FIG. 4, a single independent sensor cell 310 is placed in the illumination unit 12 in close proximity to its light emitting devices 18. The sensor cell 310 is essentially identical to the sensor cells 16 of the imaging sensor 14. Similar to the sensor cells 16, the sensor cell 310 is fed with the demodulation signal E3. When compared to FIG. 2 and FIG. 3, the 3-D imaging system 300 of FIG. 4 does not require a mixer element since the sensor cell 310 directly provides an electrical reference signal with the function of the synchronization signal E6. As will be appreciated, the independent sensor cell 310 placed inside the illumination unit 12 provides a phase reference essentially corresponding to a zero distance measurement. As explained above, the evaluation unit 330 determines distance information on the basis of the synchronization signal E6 from the sensor cell 310 and the phase information signal E4 from the imaging sensor 14.

As will be appreciated in the embodiments shown in FIGS. 2-4, the electrical reference signal E5 improves synchronization since it is directly derived from the emitted light signal L1 in the illumination unit 12. In other words, the reference signal E5 provides absolute temporal information on the emitted light signal L1 (considering the response time of the light emitting devices 18 as negligible in FIG. 2). In addition, the reference signal E5 is also indicative of the intensity of the emitted light signal L1, which is a useful information for other calibration and/or for test purposes.

The invention claimed is:

1. A 3-D imaging system comprising:
   an illumination unit for emitting light onto a target scene;
   an imaging sensor for imaging said target scene by detecting scattered/reflected light;
   an evaluation unit for determining distance information related to said target scene on the basis of light propagation time; and
   synchronization means for providing synchronization information to said evaluation unit; said synchronization means comprising means for generating an electrical reference signal in said illumination unit, said reference signal being directly derived from said emitted light.

2. The system according to claim 1, wherein said means for generating an electrical reference signal and at least one light source of said illumination unit are contiguous.

3. The system according to claim 1, wherein said means for generating an electrical reference signal is operatively independent of said imaging sensor.

4. The system according to claim 1, wherein said means for generating an electrical reference signal comprises a shunt resistor for providing a voltage as a function of an illumination current of said illumination unit.

5. The system according to claim 1, wherein said means for generating an electrical reference signal comprises an optoelectronic converter arranged in said illumination unit.

6. The system according to claim 5, wherein said optoelectronic converter is a photodiode allowing immediate detection of the light emitted by said illumination unit.

7. The system according to claim 5, wherein said optoelectronic converter is an independent sensor cell, which has essentially the same configuration as the sensor cells of said imaging sensor, allowing immediate detection of the light emitted by said illumination unit.

8. The system according to claim 1, wherein said synchronization means comprises a mixer element for reproducing the characteristics of a sensor cell of said imaging sensor.

9. The system according to claim 1, wherein said imaging sensor comprises a two-dimensional pixel array camera.

10. The system according to claim 1, wherein said evaluation unit comprises a signal processing unit which is connected to said imaging sensor and to said synchronization means.

* * * * *